US009778650B2

(12) United States Patent
Scelsi et al.

(10) Patent No.: US 9,778,650 B2
(45) Date of Patent: Oct. 3, 2017

(54) APPARATUS, SYSTEM AND METHOD FOR KITTING AND AUTOMATION ASSEMBLY

(71) Applicant: Honda Motor Co., Ltd., Minato-ku, Tokyo (JP)

(72) Inventors: John M. Scelsi, Moody, AL (US); Brian G. Jones, Talladega, AL (US)

(73) Assignee: HONDA MOTOR CO., LTD., Tokyo (JP)

( * ) Notice: Subject to any disclaimer, the term of this patent is extended or adjusted under 35 U.S.C. 154(b) by 645 days.

(21) Appl. No.: 14/102,608

(22) Filed: Dec. 11, 2013

(65) Prior Publication Data

US 2015/0160650 A1 Jun. 11, 2015

(51) Int. Cl.
  *G06F 19/00* (2011.01)
  *G05B 19/418* (2006.01)
  *B23P 21/00* (2006.01)

(52) U.S. Cl.
  CPC ........ *G05B 19/41805* (2013.01); *B23P 21/00* (2013.01); *G05B 2219/31027* (2013.01); *G05B 2219/40013* (2013.01); *Y02P 90/04* (2015.11)

(58) Field of Classification Search
  CPC ...... B25J 9/1697; B25J 9/1687; B25J 19/021; B25J 9/0084; G05B 2219/40053; G05B 2219/40035; G05B 2219/40537; G05B 2219/40583; G05B 2219/40554; G05B 19/128; G05B 19/39; G05B 19/40936; G05B 2219/37
  See application file for complete search history.

(56) References Cited

U.S. PATENT DOCUMENTS

| 528,393 | A | * | 10/1894 | Rinn | E04H 15/48 135/117 |
| 4,576,286 | A | * | 3/1986 | Buckley | B07C 5/02 209/558 |
| 4,759,112 | A | | 7/1988 | McLean et al. | |
| 4,815,190 | A | * | 3/1989 | Haba, Jr. | B23P 21/004 198/346.1 |
| 4,894,908 | A | * | 1/1990 | Haba, Jr. | B23P 21/004 29/711 |

(Continued)

FOREIGN PATENT DOCUMENTS

| GB | EP 0604619 B1 * | 1/1999 | ............. B21J 15/10 |
| GB | WO 2010112894 A1 * | 10/2010 | ............. G06T 7/001 |

*Primary Examiner* — Darrin Dunn
(74) *Attorney, Agent, or Firm* — Arent Fox LLP

(57) ABSTRACT

A method, system and apparatus for a kitting and automation assembly. The system includes an inspection apparatus that captures information of a component. A controller is coupled to the inspection apparatus for receiving and evaluating the information to determine a conforming component. The assembly apparatus includes a datum tool that is operatively configured to contact a datum reference of a part to determine a proper position of the part. The method includes capturing a data set indicative of a characteristic of a component and comparing the data set to a stored data set having a desired characteristic to determine a conforming component. The method also includes picking and positioning the conforming component at an installation position, contacting a datum reference of a part with a datum tool to confirm a proper position, and placing the conforming component on to the part at the proper position.

10 Claims, 8 Drawing Sheets

(56) References Cited

U.S. PATENT DOCUMENTS

| | | | | |
|---|---|---|---|---|
| 5,055,754 A * | 10/1991 | Kishi | ............... | G05B 19/232 318/565 |
| 5,148,591 A * | 9/1992 | Pryor | ............... | A01B 69/008 29/407.04 |
| 5,149,979 A | 9/1992 | Harrow | | |
| 5,321,353 A * | 6/1994 | Furness | ............... | B25J 9/1697 318/568.11 |
| 5,380,978 A * | 1/1995 | Pryor | ............... | B23K 26/032 219/121.64 |
| 5,542,520 A | 8/1996 | Beisel et al. | | |
| 5,687,831 A * | 11/1997 | Carlisle | ............... | A61F 11/12 198/395 |
| 5,722,148 A | 3/1998 | Uemoto et al. | | |
| 5,727,300 A | 3/1998 | Ekdahl et al. | | |
| 5,745,972 A | 5/1998 | Yokayama et al. | | |
| 5,866,916 A | 2/1999 | Pryor et al. | | |
| 5,953,812 A | 9/1999 | Ferrante | | |
| 5,981,965 A | 11/1999 | Pryor et al. | | |
| 6,066,845 A * | 5/2000 | Rueb | ............... | G01B 11/24 250/234 |
| 6,490,369 B1 * | 12/2002 | Beiman | ............... | G06K 9/42 382/151 |
| 6,563,130 B2 | 5/2003 | Dworkowski et al. | | |
| 6,681,468 B1 | 1/2004 | Uchiyama et al. | | |
| 6,804,880 B2 * | 10/2004 | Yamamoto | ............... | B23P 21/004 198/395 |
| 6,831,287 B2 * | 12/2004 | Kesil | ............... | H01L 21/68707 250/559.15 |
| 6,878,954 B2 | 4/2005 | Butler et al. | | |
| 7,084,900 B1 * | 8/2006 | Watanabe | ............... | G06K 9/6203 348/94 |
| 7,134,210 B2 | 11/2006 | Yeeles | | |
| 7,165,318 B2 | 1/2007 | Nakamura et al. | | |
| 7,191,511 B2 | 3/2007 | Noda et al. | | |
| 7,239,399 B2 | 7/2007 | Duquette et al. | | |
| 7,313,464 B1 * | 12/2007 | Perreault | ............... | B25J 9/1666 318/568.1 |
| 7,570,801 B2 | 8/2009 | Horijon | | |
| 7,797,128 B2 | 9/2010 | Ashford et al. | | |
| 8,029,224 B2 | 10/2011 | Abe et al. | | |
| 8,051,547 B2 | 11/2011 | Toh et al. | | |
| 8,172,074 B2 * | 5/2012 | Jones | ............... | B65G 43/10 134/68 |
| 8,185,238 B2 | 5/2012 | González Sainz et al. | | |
| 2003/0090682 A1 * | 5/2003 | Gooch | ............... | G01B 11/002 356/620 |
| 2006/0118459 A1 * | 6/2006 | Christensen | ............... | B23P 19/10 206/725 |
| 2007/0177790 A1 * | 8/2007 | Ban | ............... | B25J 9/1697 382/153 |
| 2008/0253612 A1 * | 10/2008 | Reyier | ............... | B25J 9/1697 382/103 |
| 2009/0046921 A1 * | 2/2009 | Case | ............... | H05K 13/08 382/145 |
| 2009/0234501 A1 * | 9/2009 | Ishizaki | ............... | B25J 9/1697 700/259 |
| 2010/0012260 A1 | 1/2010 | Brennan et al. | | |
| 2010/0092032 A1 * | 4/2010 | Boca | ............... | B25J 9/1679 382/103 |
| 2011/0074950 A1 * | 3/2011 | Oka | ............... | A61B 1/042 348/137 |
| 2012/0165986 A1 * | 6/2012 | Fuhlbrigge | ............... | B25J 9/1687 700/259 |
| 2013/0054025 A1 * | 2/2013 | Ito | ............... | B25J 9/1697 700/246 |
| 2014/0100696 A1 * | 4/2014 | Kim | ............... | B25J 9/1697 700/259 |
| 2014/0172165 A1 * | 6/2014 | Oda | ............... | G05B 19/4182 700/248 |
| 2014/0365007 A1 * | 12/2014 | Trompeter | ............... | B25J 9/1692 700/254 |

* cited by examiner

APPARATUS, SYSTEM AND METHOD FOR KITTING AND AUTOMATION ASSEMBLY

BACKGROUND

Current methods of automotive assembly include assembling a kit with automotive parts. However, there are some automotive parts such as bolts and fasteners required for the kit that are generally not included in the assembly of the kit but, rather, are picked up and installed individually by an assembler or an assembly line robot after the kit is assembled. This is an inefficient and time consuming process due, at least in part, to incorrect bolts, misplaced parts and incorrectly placed bolts.

SUMMARY

In one aspect, a kitting and automation assembly process includes a method involving the steps of scanning a component and capturing a data set indicative of a characteristic of the component. The method further involves comparing the captured data set with a stored data set having a desired characteristic and determining that the component is a conforming component if the data set matches the desired characteristics of the stored data set. Thereafter, picking and positioning the conforming component at an installation position with respect to a part by contacting a datum reference of the part with a tool. The tool having a datum finder configured to locate the datum reference at a proper alignment. The tool subsequently generates a signal confirming the tool has made contact with the datum reference at the proper alignment.

In another aspect, a kit inspection system includes an inspection apparatus. The inspection apparatus having a tool configured to scan a component and capture data indicative of characteristics of the component. A controller having a stored data set establishing a desired characteristic that defines a conforming component is coupled to the inspection apparatus for receiving and comparing the data set with the stored data set to determine a conforming component.

In still another aspect, a pick and place apparatus having a tool with a datum finder is configured to make contact with a datum reference of a work part. The pick and place apparatus further includes a controller coupled to the tool having a stored data set that establishes a proper position of the work part. The pick and place apparatus further includes a part holder to pick and place a component onto a part at an installation position.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION

Figure 1:
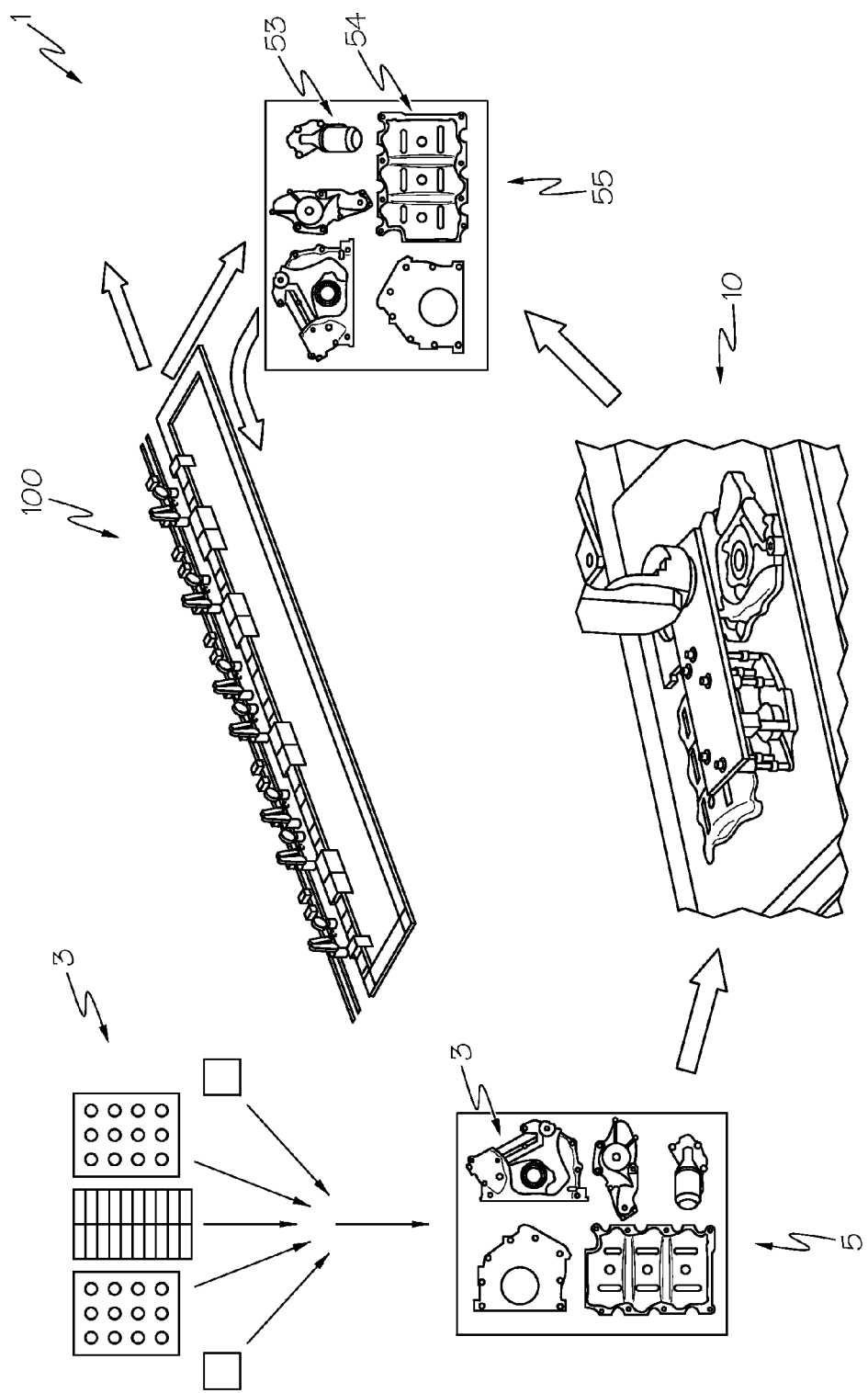
FIG. 1 is a partly schematic illustration of an exemplary kitting arrangement and automation process according to an embodiment.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Referring now to FIG. 1, a schematic illustration of an exemplary kitting arrangement and automation process 1 for inspecting and assembling components according to an embodiment. The process 1 utilizes an inspection system 10 for scanning and evaluating a component 3 retained within kit tray 5, wherein the kit tray 5 has previously been supplied with one or more components 3. The kit tray 5 may contain various parts or components such as, for example, automotive parts to be assembled. As used herein, the terms "part" and "component" are interchangeable. The kit tray 5 may also contain fasteners such as, for example, bolts or screws to be used to assemble the automotive parts. Accordingly, the inspection system 10 may capture information indicative of a characteristic of the component 3 and may evaluate the information relative to a stored set of data. The inspection system 10 may determine whether to accept the kit tray 5, thereafter outputting a conforming kit tray 55 containing a component 53, wherein the component 53 is one that has been accepted by the inspection system 10.

The process 1 further utilizes a pick and place system 100 configured to receive the conforming kit tray 55, wherein the conforming kit tray 55 may be the kit tray 5 that passed through the inspection system 10. In the alternative, the conforming kit tray 55 may not be the kit tray 5, but rather may contain a component 53 matching a characteristic of an acceptable component for the process 1. The pick and place system 100 is operatively configured to pick the component 53 from the conforming kit tray 55 and find a target installation position to place and install the component 53 on to a part 54.

Figure 2:
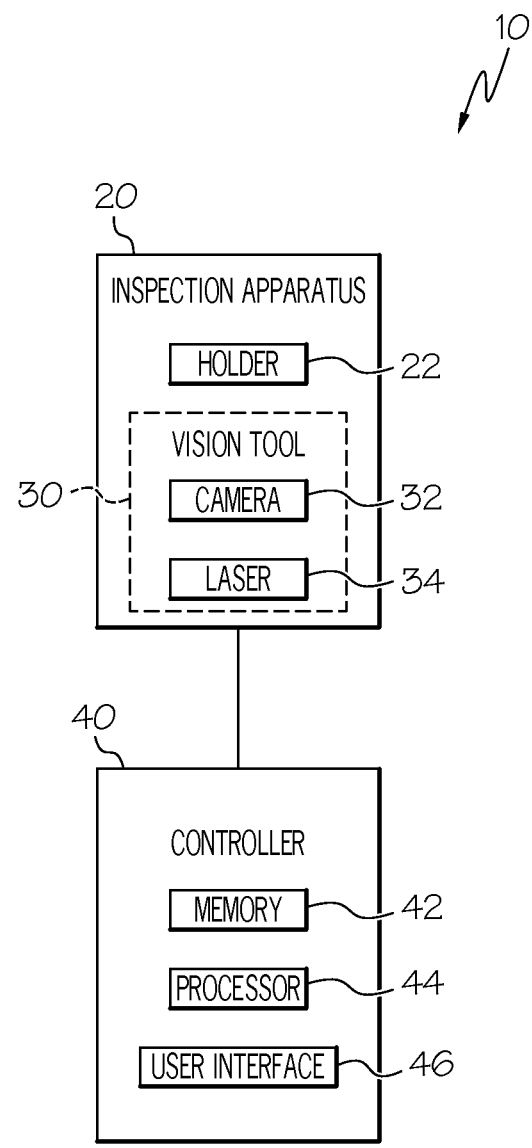
FIG. 2 is a block diagram of an inspection system according to an embodiment.

FIG. 2 is a block diagram of an exemplary inspection system 10 that will be used to describe the features of the inspection system 10 in detail according to an embodiment. The inspection system 10 includes an inspection apparatus 20 that is operatively coupled to a controller 40 to transmit and receive information. The inspection apparatus 20 is operable to generate information about a component 3 undergoing inspection. Accordingly, the inspection apparatus 20 includes a holder 22, such as a robot or robot arm, and an examination tool 30 having one or more examining devices configured to inspect or scan the component 3. One skilled in the art will readily appreciate that the examining devices may be a camera 32, a laser 34, or any other suitable examining devices of the sort.

The controller 40 is operatively coupled to the inspection apparatus 20 to receive the information generated by the inspection apparatus and store or transmit data corresponding to the generated information. The controller 40 further includes a memory 42 that is coupled to a processor 44 to evaluate the information generated by the inspection apparatus 20. The processor 44 could be a central processor unit, a microprocessor, an application-specific instruction-set processor, a digital signal processor, a specialized microprocessor, a data processor, an audio processor or the like. A user interface 46 such a monitor, a key pad, a touch panel or the like is connected to or in communication with the memory 42 to relay a stored data set pertaining to the component. Prior to the inspection of a component, a user may select the stored data set from memory 42 or enter data pertaining to the component 3 into the controller 40 using the user interface 46 to enter information into the inspection system 10. The memory 42 may include a data storage device, such as a flash drive, or an optical disk drive operable to read the stored data set for the component 3 from the data storage device.

Turning to the operation of the inspection system 10 according to an embodiment, the kit tray 5 containing one or more components 3 is received by the inspection system 10. The tool 30 is operatively manipulated by the controller 40 to generate inspection information and perform measurements of the components 3. For example, the generated inspection information may include information pertaining to the absence of a component, information pertaining to the improper loading of a component, or information pertaining to the inclusion of an incorrect component, a combination of all this information, or the like. If the component 3 is a fastener for example, the measurements may also include dimensional measurements such as information about a bolt height or information about a bolt diameter. The controller 40 in communication with the processor 44 transmits the inspection information generated by the inspection apparatus 20 to the processor 44, which may perform pre-programmed routines, including the generation and compilation of statistical information based upon the transferred quality inspection and dimensional information.

The processor 44 may also perform pre-programmed comparison routines wherein the dimensional measurements are compared to a stored data set in the memory 42 pertaining to the component selected by the user interface 46 in order to determine a component 53 that is acceptable to the inspection system. The stored data set contains a desired characteristic that defines a conforming component such as, for example, an upper and lower tolerance limit for the height of an acceptable component or the orientation of a conforming component. In one embodiment, the processor 44 is configured to continuously generate measurement information and directly provide the information to the user. The user may view the image and measurement information generated by the inspection apparatus 20 using a display device such as a monitor, a printer, or other similar devices. In another embodiment, the processor 44 is configured to accept or to reject the kit tray 5 based on whether the generated measurement information of the component 3 matches the desired characteristics of the stored data set or falls within a pre-determined tolerance limits. In another embodiment, the processor may cause the inspection apparatus 20 to pause its operation when the component 3 does match the desired characteristics of the stored data in the memory 42 pertaining to the component selected by the user interface 46.

Figure 3:
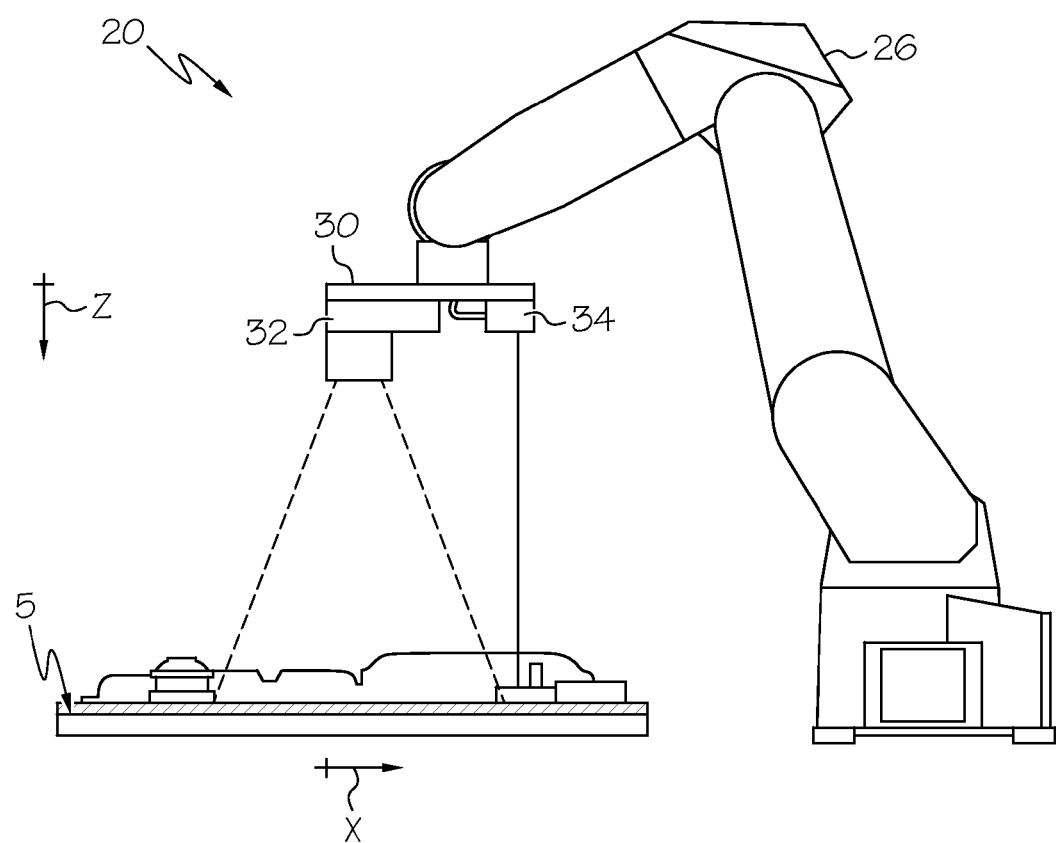
FIG. 3 is a side view of an exemplary inspection apparatus according to an embodiment.

FIG. 3 is a side view of an exemplary inspection apparatus that will be used to describe the inspection apparatus 20 in greater detail according to an embodiment. The inspection apparatus 20 comprises a robot arm 26 positioned to rotatably support an examination tool 30 having at least one examining device to examine the component 3. In one embodiment, the tool 30 comprises a camera 32 and a laser 34 affixed to a surface of the tool 30. The robot arm 26, the camera 32 and the laser 34 are in communication with the processor 44; for example, they may each include a digital data port that is electrically coupled to the controller 40 to transfer digital data to the processor 44. The inspection apparatus 20 is configured to receive the kit tray 5 containing the component 3 to undergo inspection. In an alternate embodiment, the kit tray 5 may be adapted to have an adjustable plate and operatively coupled to the inspection apparatus 20 such that the inspection apparatus 20 may determine the height of a component 3 within the kit tray 5 relative to the adjustable plate of the kit tray 5 when the component 3 undergoes inspection.

Still referring to FIG. 3, a z-axis is substantially perpendicular to the mounting surface of the tool 30. The camera 32 captures an image of the kit tray 5 and the components 3. The laser 34 projects a beam substantially parallel to the z-axis on to the kit tray 5 generating information concerning the components 3, for example, a dimensional characteristic of the component 3 such as the height of the fastener. The generated z-axis information is communicated to the controller 40 relaying varying information according to exemplary embodiments depicted by FIG. 4 and FIG. 5.

Figure 4:
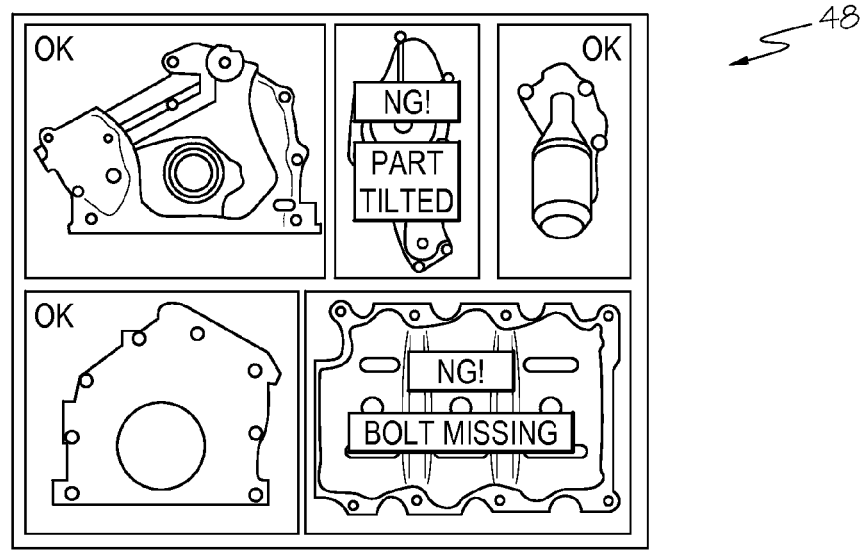
FIG. 4 is an exemplary illustration of an output of inspection information.

The camera 32 may output an image, for example, as shown in FIG. 4 on to a display device at the user interface 46 showing a captured image with inspection information 48 of the components 3 and of the kit tray 5. The captured image with inspection information 48 may relay information about the components 3 pertaining to linear displacement, such as incorrect position or incorrect orientation of a component (e.g., part tilted). The captured image with inspection information 48 may also relay the absence of a component (e.g., bolt missing). The inspection information may indicate a component as acceptable or unacceptable, for example, by words (e.g., OK for good and NG for no good), color (e.g., green for good and red for no good), highlighted areas, or any other indicators.

Figure 5:
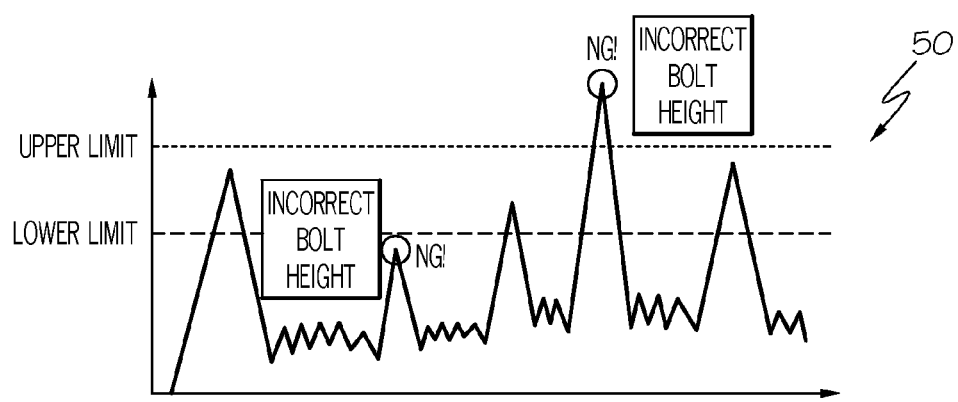
FIG. 5 is another exemplary illustration of an output of inspection information.

In a similar manner, the beam projected by laser 34 may be used to generate a graphic representation, for example, as shown in FIG. 5 for display on a display device at the user interface 46 for showing graphical data with inspection information 50 of the component 3. The graphical data with inspection information 50 may relay information such as, the presence of a component 3, or indicate information pertaining to the dimensional characteristic of the component, such as whether the height of a component 3 above the adjustable plate or surface of the kit tray 5 falls within a pre-set upper and lower limit, or other quality information of the sorts. For example, if the component is above an upper height limit or below a lower height limit, then the inspection system will determine the component is the incorrect size and indicate that it is a no good (NG) part.

Figure 6:
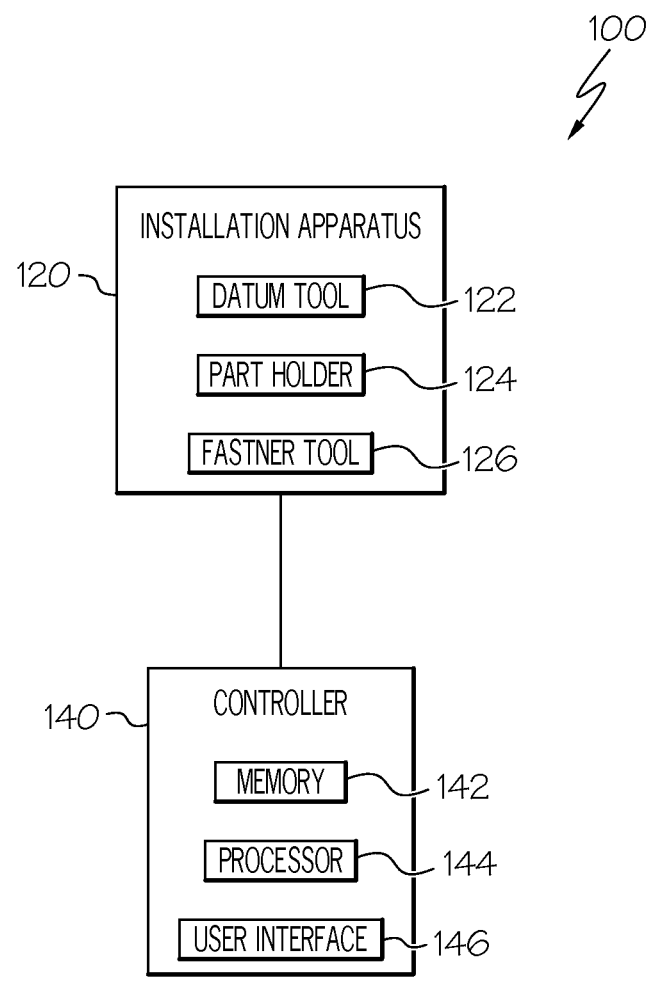
FIG. 6 is a block diagram of a pick and place system according to an embodiment.

FIG. 6 a block diagram of the pick and place system 100 will be used to describe the features of the pick and place system 100 in detail according to an embodiment. The pick and place system 100 includes an installation or assembly apparatus 120 that is operatively coupled to a controller 140 to transmit and receive information. The assembly apparatus 120 is operable to pick and place a component 53 to be installed on to a work part 54, wherein the component 53 may be a partial engine or automotive part, for example, a water pump having fasteners such as bolts or screws retained within the water pump, and the part 54 may be a corresponding engine or automotive part that together with the component 53 make a whole engine or automotive part. In the illustrated embodiment, the part 54 is positioned within the conforming kit tray 55. In an alternate embodiment, the part 54 may not be with the conforming kit tray 55, rather separately supplied to the pick and place system 100.

The assembly apparatus 120 includes a datum tool 122 having at least one datum finder configured to locate a datum reference on the part 54. The datum reference serves as a locating or positioning feature for the datum tool 122 and could be, for example, a hole, a slot, a peg or a rivet situated on a surface of the part 54. The datum reference may be created during the manufacturing of the part 54. One skilled in the art will appreciate the datum reference may be created differently depending on the requirements and functionality of the work part. The assembly apparatus 120 also includes a part holder 124 operatively configured to pick up and retain at least one component 53 to be installed. The assembly apparatus 120 further includes a fastening tool 126 operatively configured to install the component 53 on to the part 54.

The controller 140, operatively coupled to the assembly apparatus 120, includes a memory 142 that is coupled to a processor 144 and a user interface 146. Prior to the installation of the component 53 to the part 54, a user may select or enter data pertaining either the component 53 or the part 54 into the controller 140 using the user interface 146 to enter information into the pick and place system 100. The memory 142 may be a data storage device, such as a flash drive, or an optical disk drive operable to read the data for a work part from the data storage device.

Figure 7:
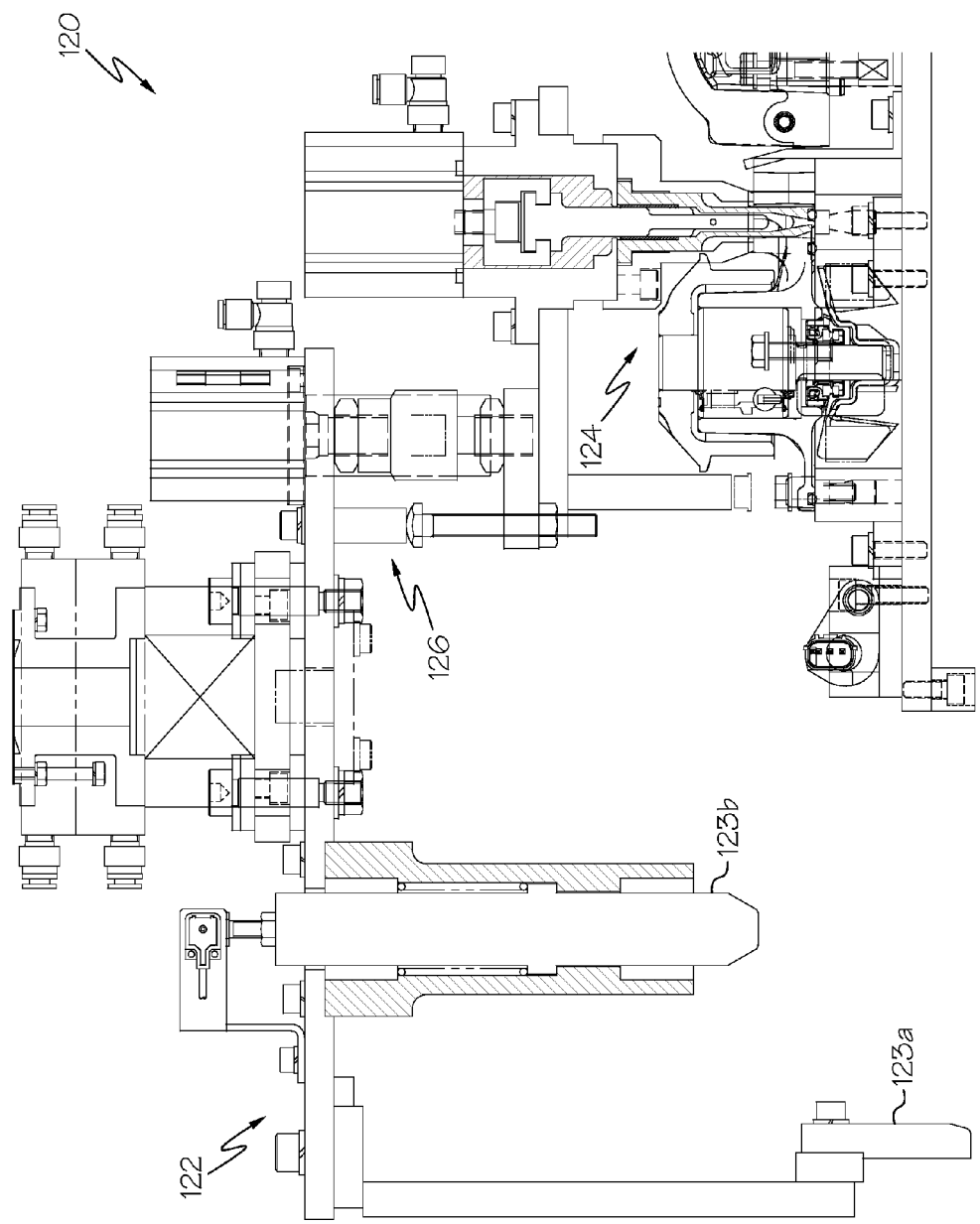
FIG. 7 is a sectional side view of an exemplary assembly apparatus according to an embodiment.

FIG. 7 is a sectional view of an exemplary assembly apparatus that will be used to describe the features of the assembly apparatus 120 according to an embodiment. The assembly apparatus 120 comprises a datum tool 122 having datum finders 123 operatively configured to locate or contact datum references positioned on surfaces of the part 54. One skilled in the art will appreciate that datum finders may have tolerance limits specified to them to accommodate variations to the datum references which can occur in the manufacturing of the part 54. The datum finder may be a feature such as, for example a pin, plate, pad, lug or any other features of the sorts. In the illustrated embodiment, the datum tool 122 comprises a first datum finder 123a and a second datum finder 123b. The first datum finder 123a may be a pad as shown and is configured to contact a first surface of the part 54. The second datum finder 123b may be a pin as shown, and is configured to contact a second surface of the part 54. In an embodiment, the first datum 123a finder is configured to contact a vertical surface of the part 54, while the second datum finder 123b is configured to contact a horizontal surface of the part 54. The first datum finder 123a and second datum finder 123b may concurrently contact the part 54 or may separately contact the part 54. The datum tool 122 further comprises a sensor (not shown) in communication with the controller 140. The sensor is configured to generate a signal when the datum tool 122 locates or makes contact with the datum reference and transmit the signal to the controller 140. The assembly apparatus 120 further comprises a part holder 124 operable to pick and retain the component 53. The part holder is configured to retain the component 53 that may, for example, be an automotive part having a bolt or fastener retained. The part holder 124 is operatively coupled to the controller 140 to transfer and receive digital signals; for example, the part holder 124 may include a digital data port that is electrically coupled to the controller 140 to receive the signal from the datum tool 122. Upon receiving the signal, the part holder 124 places the component on to the part 54 at the installation position. The assembly apparatus 120 further comprises a fastening tool 126 operable to install the component 53 on to the part 54.

Figure 8:
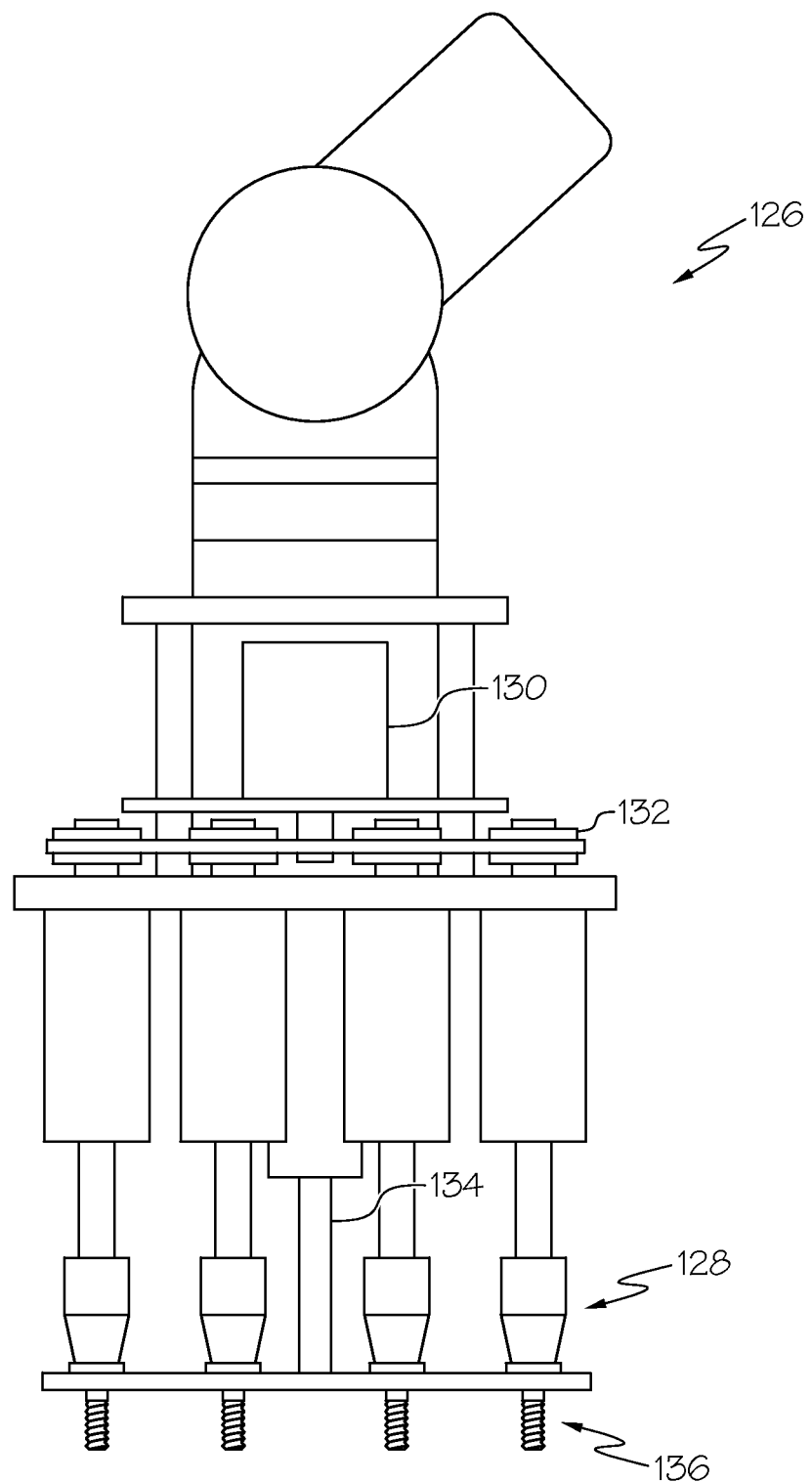
FIG. 8 is a side view of an exemplary fastening tool according to an embodiment

FIG. 8 is a side view of an exemplary fastening tool that will be used to describe the fastening tool 126 in greater detail according to an embodiment. The fastening tool 126 comprises a plurality of spindles 128. In an embodiment, the spindles 128 may be spring loaded. Each spindle 128 is attached to a motor 130 via a chain drive. Each spindle 128 further has a clutch 132 to engage and disengage each spindle 128 independently. As such, the chain drive can simultaneously rotate each of the spindles 128. The fastening tool 126 further comprises a datum locator 134 configured to locate a datum target on a part 54. One skilled in the art will appreciate that the datum target may be the same datum reference used by the datum tool 122 or may be adapted particularly for the datum locator 134. The datum target may be used either as a secondary confirmation of the proper position of the part 54 or a backup check for the proper position in the event that part of the assembly apparatus is inoperative. The fastening tool 126 may be configured to independently engage a fastener retained in the component 53 and simultaneously secure the fastener to the part 54. In the illustrated embodiment, each spindle 128 grips a fastener 136 retained within the component 53 when the component 53 is pick from the conforming kit tray 55 and prepares for the installation of the fastener when the component 53 is on the part 54. As the spindles are rotated, the captured fasteners will rotate thus attaching the component 53 to the part 54 at the installation position.

Figure 9:
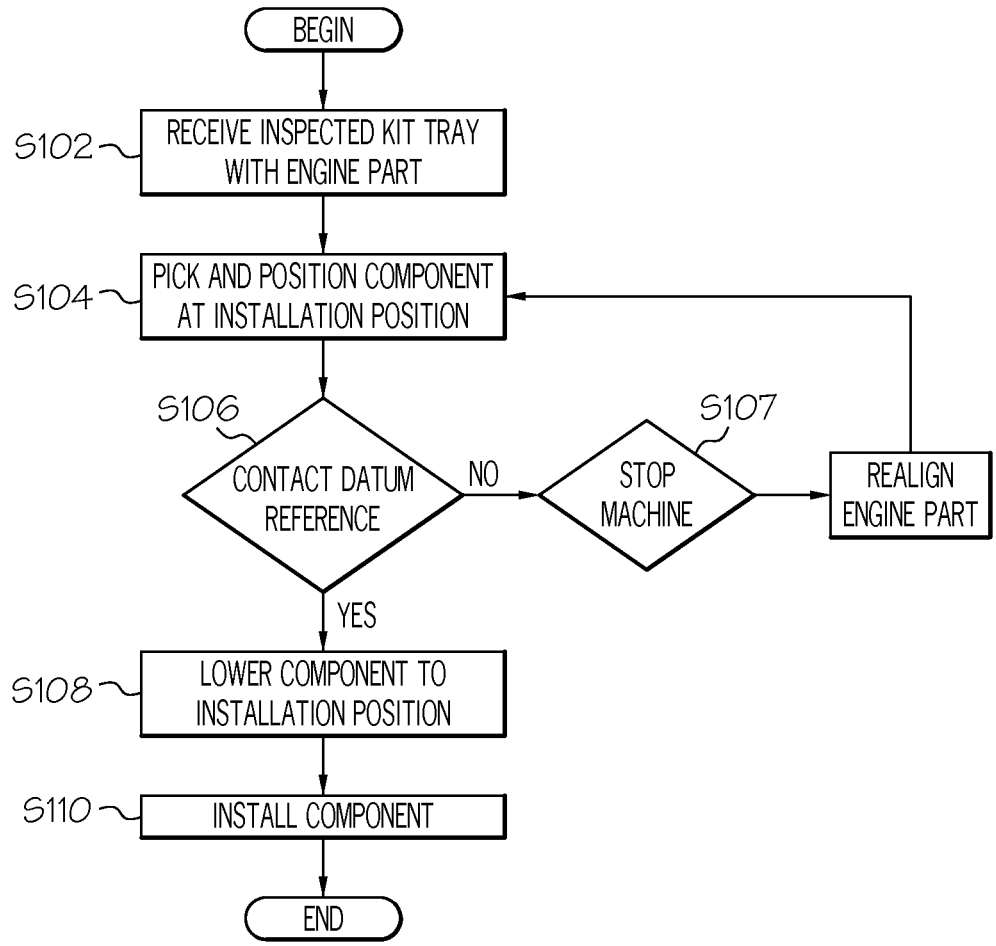
FIG. 9 is a flow chart of an exemplary process for the pick and place system of FIG. 6.

Referring now to FIG. 9, a flow diagram illustrating a sequence of operations by a pick and place system 100 for installing a component 53 on to a part 54 according to an embodiment. In step S102 the pick and place system 100 receives a conforming kit tray 55, wherein the conforming kit tray 55 is an accepted kit tray 5 following the inspection system 10. In an alternative embodiment, the conforming kit tray 55 may have bypassed the inspection system 10 and, for example, undergone manual inspection. In step S104 the part holder 124 picks a component 53 from the conforming kit tray 55 and positions the component 53 at an installation position, wherein the installation position is a pre-determined position that may be different depending on either the component 53, or the part 54, or an arbitrary position in space. In step S106 the datum tool 122 having at least one datum finder 123 configured to locate a datum reference, locates or makes contact with at least one datum reference on the part 54. In optional step S107, it may be determined the datum tool 122 did not locate or make contact with a datum reference on the part 54 thereby stopping the operation of the pick and place system 100 to realign the part 54. In an alternate embodiment, the pick and place system 100 may reject the part 54 and continue operation of the pick and place system 100. In yet another embodiment, the pick and place system 100 may retry to contact a datum reference on the part 54. If the datum tool 122 does locate or make contact with a datum reference, the datum tool 122 generates a signal enabling the system 100 to proceed to step S108. In step S108 the part holder 124 places the component 53 on to the part 54 at the installation position. In step S110 the fastening tool 126 installs the component 53 on to the part 54. One skilled in the art will readily appreciate that the order of the steps in FIG. 9 may vary and the association between the features of the system may be different.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method for a kitting and automation process, the method comprising the steps of:
    scanning a component within a kit tray using an inspection apparatus;
    capturing a data set indicative of a characteristic of the component using the inspection apparatus;
    comparing the data set with a stored data set having a desired characteristic;
    determining that the component is a conforming component if the data set matches the desired characteristic of the stored data set;
    picking the conforming component using a part holder, wherein the part holder is adapted to retain the conforming component;
    positioning the conforming component at an installation position with respect to a part, wherein positioning the conforming component further comprises:
        contacting a datum reference of the part with a tool, the tool having a datum finder configured to locate the datum reference at a proper alignment;
        generating a signal confirming the tool has made contact with the datum reference at the proper alignment based on the signal; and
        moving the part holder to the part at the installation position and placing the conforming component on the part at the installation position, based on the signal, wherein the part holder is in operative communication with the tool to receive the signal; and
        engaging at least one spindle with a fastener retained on the component, wherein the datum reference is located radially inward with respect to the spindle.

2. The method for the kitting and automation process as defined in claim 1, further including a step of creating an image as the inspection apparatus is capturing the data set of the component.

3. The method for the kitting and automation process as defined in claim 2, further including a step of viewing the image with a display device.

4. The method for the kitting and automation process as defined in claim 1, further including a step of pausing the process when the component does not match the desired characteristics established by the stored data set.

5. The method for the kitting and automation process as defined in claim 1, further including a step of stopping the process when the tool does not make contact with the datum reference.

6. A system for kit inspection, the system comprising:
    an inspection apparatus having a tool operatively configured to scan a component, the tool comprising;
    a laser configured to capture a dimensional characteristic of the component, and
    a camera configured to sense a linear displacement of the component, wherein the tool is adapted to capture a data set indicative of a dimensional characteristic of the component and a linear displacement of the component;
    a controller operatively coupled to the inspection apparatus for receiving the data set, the controller having a stored data set specific to the component for establishing a desired characteristic that defines a conforming component; and
    a processor in operative communication with the controller, the processor adapted to evaluate the data set with respect to the stored data set, wherein the processor is configured to determine if the component is a conforming component based on the captured data set;
    a part holder for picking the conforming component, wherein the part holder is capable of retaining the conforming component and positioning the conforming component at an installation position with respect to a part, wherein positioning the conforming component further comprises:
        contacting a datum reference of the part with a tool, the tool having a datum finder configured to locate the datum reference at a proper alignment;
        generating a signal confirming the tool has made contact with the datum reference at the proper alignment based on the signal; and
        moving the part holder to the part at the installation position and placing the conforming component on the part at the installation position, based on the signal, wherein the part holder is in operative communication with the tool to receive the signal; and
        engaging at least one spindle with a fastener retained on the component, wherein the datum reference is located radially inward with respect to the spindle.

7. The system according to claim 6, wherein the inspection apparatus is adapted to scan a component retained within a kit tray.

8. The system according to claim 7, wherein the kit tray is configured to have an adjustable surface.

9. The system according to claim 7, wherein the inspection apparatus is operatively configured to scan the component relative to the adjustable surface of the kit tray.

10. The system according to claim 6, wherein the laser projects a beam on to the component generating a graphic representation that indicates the dimensional characteristic of the component.

* * * * *